(12) United States Patent  
Rüdle

(10) Patent No.: US 7,370,742 B2  
(45) Date of Patent: May 13, 2008

(54) SHIFTING DEVICE

(75) Inventor: Harald Rüdle, Stuttgart (DE)

(73) Assignee: Daimler AG, Stuttgart (DE)

( * ) Notice: Subject to any disclaimer, the term of this patent is extended or adjusted under 35 U.S.C. 154(b) by 291 days.

(21) Appl. No.: 11/245,944

(22) Filed: Oct. 7, 2005

(65) Prior Publication Data

US 2006/0076206 A1 Apr. 13, 2006

(30) Foreign Application Priority Data

Oct. 9, 2004 (DE) .................... 10 2004 049 273

(51) Int. Cl.  
*F16D 21/02* (2006.01)
(52) U.S. Cl. .................... 192/48.91; 192/69.9; 74/373
(58) Field of Classification Search ............. 192/48.91, 192/69.9; 74/373  
See application file for complete search history.

(56) References Cited

U.S. PATENT DOCUMENTS

| 1,786,980 | A | | 12/1930 | Carling | |
|---|---|---|---|---|---|
| 4,096,932 | A | * | 6/1978 | Liberty, Jr. | ............... 192/48.91 |
| 5,335,762 | A | * | 8/1994 | Raue | ........................ 192/48.91 |
| 6,755,090 | B2 | * | 6/2004 | Ima | ............................. 74/330 |

FOREIGN PATENT DOCUMENTS

| DE | 100 37 401 | 2/2002 |
|---|---|---|
| GB | 1 344 115 | 1/1974 |

* cited by examiner

*Primary Examiner*—Richard M Lorence  
(74) *Attorney, Agent, or Firm*—Klaus J. Bach

(57) ABSTRACT

In a shifting device comprising a shiftable double member arrangement and a shifting element for shifting the double member arrangement, the shifting element is arranged at least partially at a side of and next to, the double member arrangement.

5 Claims, 2 Drawing Sheets

SHIFTING DEVICE

BACKGROUND OF THE INVENTION

The invention resides in a shifting device comprising a shiftable double member arrangement and a shifting element for shifting the double member arrangement.

DE 100 37 401 A1 discloses a shifting device with a double gear structure which can be shifted by a first shifting unit. The first shifting unit includes a slide sleeve which is disposed between two rotatable gears forming the double gear arrangement. Furthermore, the shifting device includes a second shifting unit which is partially integral with the first shifting unit and comprises a speed synchronizing unit, by way of which each rotatable gear of the double gear arrangement can be coupled for rotation with the shaft on which the rotatable gears are supported. The speed synchronizing unit includes a speed synchronizing body disposed between the rotatable gears of the double gear arrangement and a speed synchronizing body arranged beside the double gear arrangement.

It is the object of the present invention to provide a shifting device which is shorter than conventional shifting devices of the type with which the present invention is concerned.

SUMMARY OF THE INVENTION

In a shifting device comprising a shiftable double member structure and a shifting element for shifting the double member structure, the shifting element is arranged at least partially at a side next to the double member structure.

A shiftable double member arrangement in this connection comprises particularly two rotatable gears, two hollow shafts or a rotatable gear and a hollow shaft which can be coupled by a shifting device for rotation with each other. Shifting of the double member structure means the direct coupling and/or uncoupling of the double member structure. With the arrangement according to the invention, the double member structure is particularly short in axial direction and the shifting device has a relatively small number of components, particularly if at least one shifting sleeve of the first shifting unit is arranged besides the double member structure and/or one shifting sleeve of the first shifting unit extends through a component of the double structure. The first and the second shift unit may be partially integral or they may be completely separated.

In a particular embodiment of the invention, the first shifting unit comprises a first and second shift sleeve which can be axially coupled and uncoupled circumferentially. In this way, at least certain components can be utilized for several functions in a simple manner particularly if one of the shift sleeves is connected for rotation with the shaft carrying the double member structure via speed synchronizing bodies. The shift sleeve which is mounted for rotation with the shaft carrying particularly the double member structure can therefore advantageously be used for shifting the double structure and for shifting another component such as a rotatable gear or a hollow shaft.

The shifting sleeves may be coupled together by another component in axial direction, for example, by via a double fork or they may be interconnected directly that is without any intermediate component whereby even more space and components are saved.

Furthermore, the shifting device may include a second shifting structure with a speed synchronizing unit by which at least one member of the double member arrangement can be connected via the synchronizing unit for rotation with a shaft carrying the double member arrangement, wherein the synchronizing unit is arranged next to the double member arrangement s or respectively, the double member arrangement is not provided with an intermediate synchronization body of the speed synchronization unit. Under "synchronization unit a unit is to be understood with one or several synchronization bodies which are coupled for rotation with the shaft carrying the double member arrangement.

With the arrangement according to the invention, the double member arrangement may also be very short in an axial direction and the speed synchronization unit of the second shifting unit as well as at least one rotatable member of the double member arrangement can be used in a simple manner for additional shifting functions so that additional components, space, weight and assembly efforts and expenses can be saved, particularly if the speed synchronization unit is provided for the coupling with a rotatable component which is separate from the double member arrangement, that is, a rotatable gear and/or a hollow shaft.

The device according to the invention may be used in connection with any suitable transmission but it is particularly advantageous in connection with double clutch transmissions wherein double structures are frequently used. They involve double utilization of transmission planes and are particularly advantageous because clutches increase the construction length which is contracted by the arrangement according to the invention.

The invention and further advantages thereof will become more readily apparent from the following description of an advantageous embodiment thereof on the basis of the accompanying drawings.

DESCRIPTION OF A PREFERRED EMBODIMENT

Figure 1:
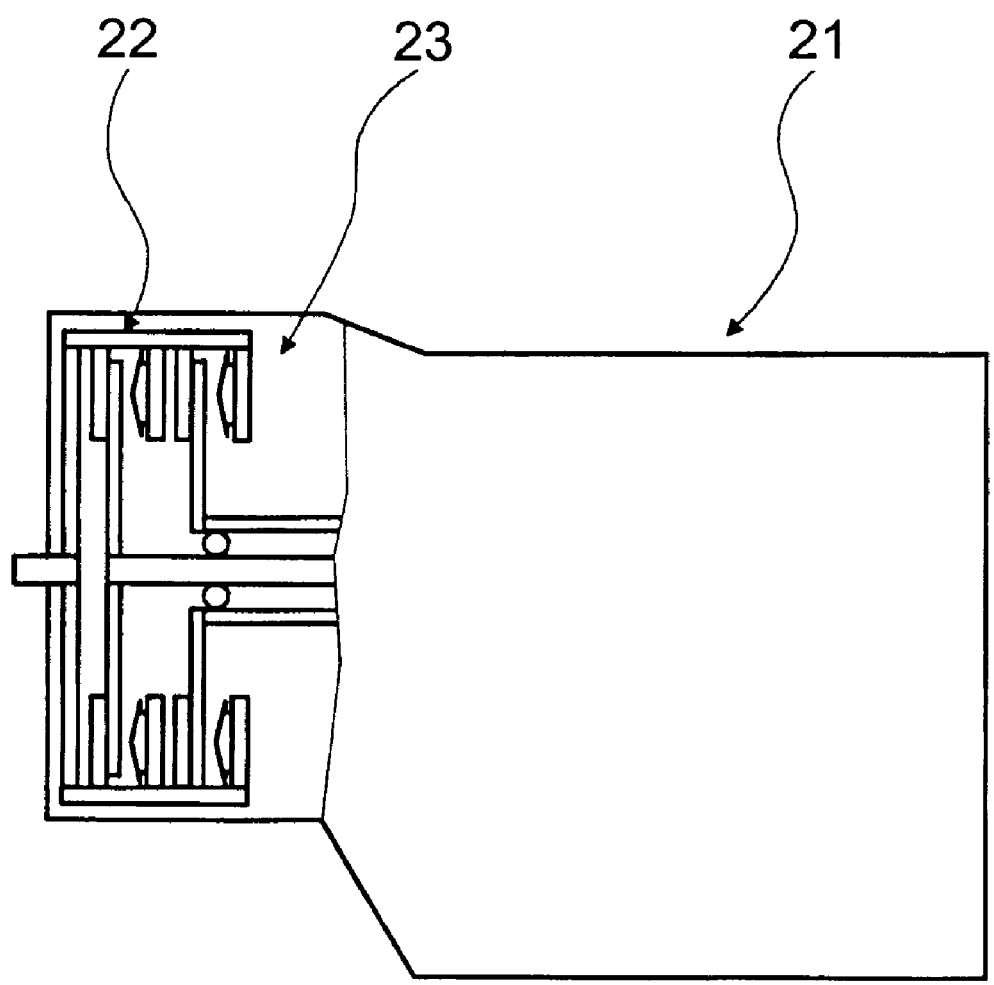
FIG. 1 shows schematically a double clutch transmission.
Figure 2:
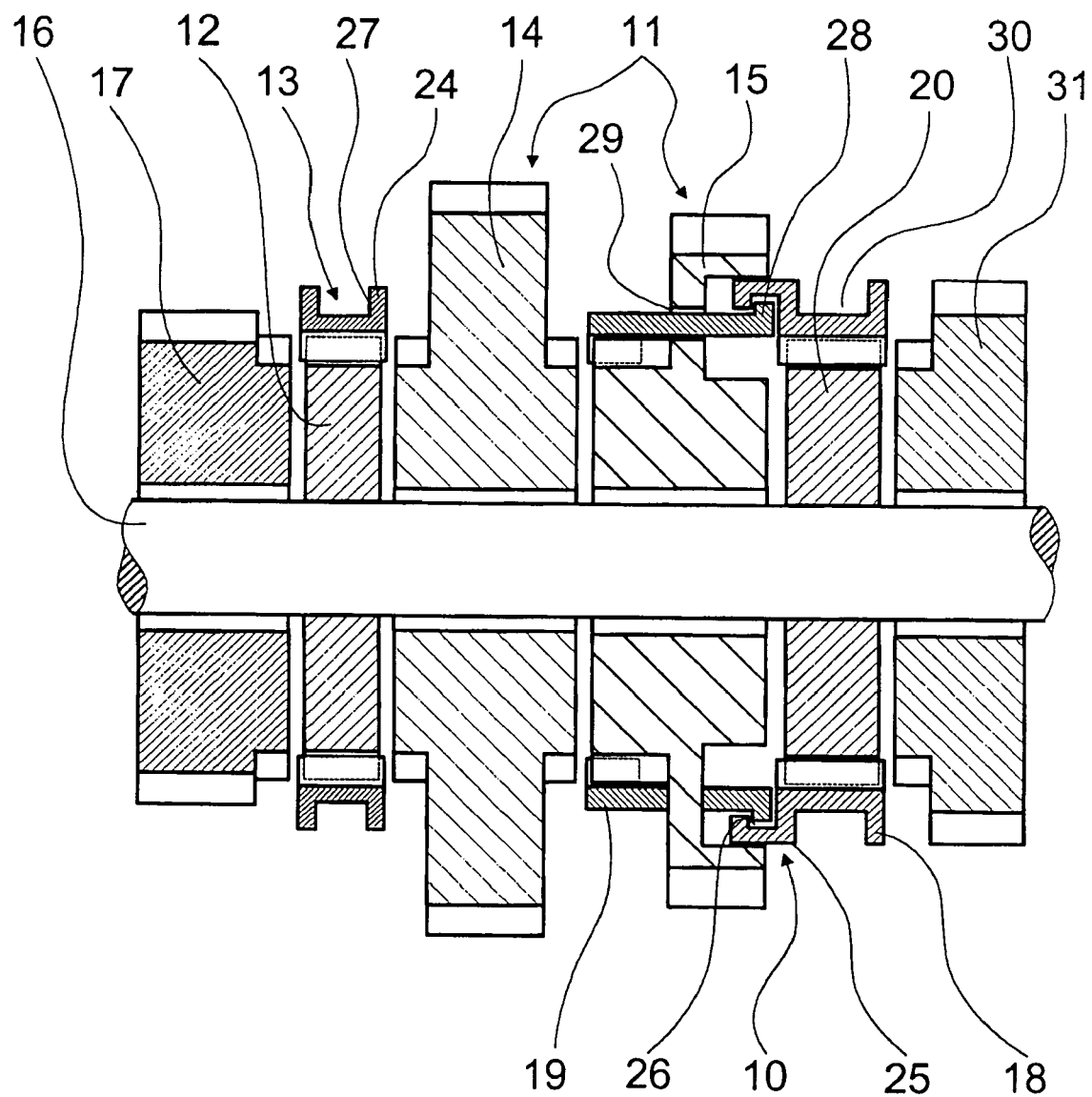
FIG. 2 shows schematically a shifting structure of the double clutch transmission shown in FIG. 1.

FIGS. 1 and 2 show a double clutch transmission 21 with a first and a second friction clutch 22, 23. The double clutch transmission 21 comprises a shifting device with a shiftable double member arrangement 11 and a first shifting unit 10 for shifting the double member arrangement 11 and a second shifting unit 12 which includes a synchronization unit 13, by which a first member 14, which is formed by a rotatable gear 14 of the double structure 11 can be connected, via the synchronization unit 12 for rotation with a shaft 16 supporting the double member arrangement 11 (FIG. 2).

The synchronization unit 12 is arranged directly next to the double member arrangement 11, that is, the double member arrangement 11 does not include an intermediate synchronization body.

The synchronization unit 12 comprises a synchronization body which is firmly mounted on the shaft 16 for rotation therewith and is provided for coupling to a rotatable gear 17 which is separate from the double member arrangement 11. To this end, a shifting sleeve 24 of the second shifting unit 13 is provided on the synchronization body which is slidable in axial direction, and by which the synchronization body of the synchronization unit 12 can be coupled with the first member 14 of the double member arrangement 11, and, alternatively with the rotatable gear 17 for rotation therewith. The first shifting sleeve 24 is provided with a circumferential groove 27 adapted to receive a shifting fork which is not shown.

The first shifting unit 10 by which the double member arrangement 11 can be shifted is arranged partially between the first member 14 of the double member arrangement 11 and a second member 15 of double member arrangement 11 which also comprises a rotatable gear and is arranged partially next the double member arrangement 11. The first shifting unit 10 includes next to the second member 15 of the double member arrangement 11, a first shifting sleeve 18. The first shifting sleeve 18 is supported axially movably on a synchronization body 20 and is connected to the shaft 16 for rotation therewith via the synchronization body 20. Furthermore, the shifting unit 10 includes, in addition to the first shifting sleeve 18, a second shifting sleeve 19. The shifting sleeve 18 and 19 are directly coupled together in axial direction without intermediate component but are movable relative to each other in circumferential direction. To this end, the first shifting sleeve 18 is provided at its side adjacent the double member arrangement 11, with art annular element 25 which, at its internal circumference, includes a groove 26. The second shifting sleeve 19 is provided at the side thereof next to the first shifting sleeve 18 with an outer circumferential web 28, which is received in the groove 26 of the first shifting sleeve 18 in an axially form-locking manner.

The second shifting sleeve 19 extends through several openings 29 of the second member 15 to the first structure 18 of the double member arrangement 11 and is connected to the second member 15 for rotation therewith. The shifting sleeve 19 is arranged partially between the structures 14, 15 of the double structure 11 and partially adjacent the structure 15 of the double member arrangement 11.

The first shifting sleeve 18 is provided at its circumference with a circumferential groove 30 for engagement with a shifting fork which is not shown. If this first shifting sleeve 18 is moved by the shifting fork in axial direction toward the double member arrangement 11, the second shifting sleeve 19 is moved together with the first shifting sleeve 18 and the double member arrangement 11 is shifted by the second shifting sleeve 19, that is, the first member 14 and the second member 15 of the double member arrangement 11 are coupled rotationally via the second shifting sleeve 19. The second member 15 of the double member arrangement 11 serves to reverse the direction of rotation for the reverse gear. If the first shifting sleeve 18 is moved axially by the shifting fork in the direction away from double member arrangement 11, another rotatably supported gear 31 is connected for rotation with the synchronization body 20 and, as a result, with the shaft 16.

Alternatively to a direct axial coupling between the second shifting sleeve 19 and the first shifting sleeve 18, the two shifting sleeves 19 and 18 could be operated by separate shifting forks or by a double fork. The rotatable gear 31 arranged beside the double member arrangement 11 could then be coupled to the shaft 16 for rotation therewith by a separate shifting unit which may be arranged for example at the side of the rotatable gear 31 remote from the double member arrangement 11.

The first shifting unit 10 comprises a synchronizing unit for synchronizing the rotation of the shaft 16 and the rotatable wheel 31 as well as a synchronizing unit for synchronizing the rotation of the members 14, 15 of the double member arrangement 11, neither of these synchronizing units being shown in the drawings. The synchronizing unit for synchronizing the rotation of the members 14, 15 of the double member arrangement 11 is advantageously arranged between the members 14, 15 of the double member arrangement 11. It is also possible to forgo the synchronization between the structures 14 and 15.

The second shifting unit 13 furthermore comprises a synchronizing unit for the synchronization of the shaft 16 and the first member 14 of the double member arrangement 11 and a synchronizing unit for the synchronization of the shaft 16 and the rotatable gear 17, neither, being shown in the drawings.

What is claimed is:

1. A shifting device for two gear members 14, 15 arranged side-by-side and forming a shiftable double member arrangement ((11)) and a first shifting unit (10) including at least first and second shifting sleeves (18, 19) with one (19) of the sleeves (18, 19) being disposed adjacent the double member arrangement (11) and both sleeves being coupled for axial movement for shifting the double member arrangement (11), but being rotatable relative to each other, the second sleeve (19) of said first shifting unit (10) being arranged at least partially on one side of the double member arrangement (11) and having sections extending through openings (29) in one of the two gear members (15) for engagement with the other gear member (14).

2. A shifting device according to claim 1, wherein the first and the second shifting sleeve (18, 19) are directly coupled for common movement in axial direction without any intermediate components.

3. A shifting device according to claim 1, wherein one of the shifting sleeves (18, 19) is connected via synchronizing body (20) to a rotational shaft (16).

4. A shifting device according to claim 1, including a second shifting unit (13) with a speed synchronizing unit (12), via which at least one member (14) of the double member arrangement (11) is connected to the shaft (16) for rotation therewith, said speed synchronizing unit being arranged directly adjacent the double member arrangement (11).

5. A shifting device according to claim 4, wherein the speed synchronizing unit (12) is provided between the double member structure (11) and a separate rotatable member (17) for coupling the separate rotatable member (17) with the double member arrangement (11).

* * * * *